United States Patent
Yamakawa et al.

(10) Patent No.: US 8,284,364 B2
(45) Date of Patent: Oct. 9, 2012

(54) ACTIVE MATRIX DISPLAY DEVICE

(75) Inventors: Ichiro Yamakawa, Fujisawa (JP); Kazuhiko Horikoshi, Yokohama (JP); Naotoshi Akamatsu, Fujisawa (JP); Jun Gotoh, Mobara (JP); Hiroaki Asuma, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 415 days.

(21) Appl. No.: 12/765,105

(22) Filed: Apr. 22, 2010

(65) Prior Publication Data

US 2010/0271582 A1    Oct. 28, 2010

(30) Foreign Application Priority Data

Apr. 23, 2009    (JP) .................. 2009-104953

(51) Int. Cl.
G02F 1/1333    (2006.01)
(52) U.S. Cl. .................. 349/138; 349/139; 349/158
(58) Field of Classification Search .................. 349/139, 349/138, 141, 148, 149, 151, 152, 158
See application file for complete search history.

(56) References Cited

U.S. PATENT DOCUMENTS

| | | | |
|---|---|---|---|
| 2002/0013019 A1* | 1/2002 | Ohtani et al. | 438/142 |
| 2007/0295964 A1* | 12/2007 | Ishikawa | 257/66 |
| 2007/0298538 A1 | 12/2007 | Tanabe et al. | |
| 2008/0013023 A1* | 1/2008 | Ochiai et al. | 349/114 |
| 2009/0046230 A1* | 2/2009 | Sakurai et al. | 349/138 |
| 2010/0271582 A1* | 10/2010 | Yamakawa et al. | 349/138 |
| 2011/0037072 A1* | 2/2011 | Moriwaki | 257/59 |
| 2011/0199564 A1* | 8/2011 | Moriwaki | 349/122 |

FOREIGN PATENT DOCUMENTS

| | | |
|---|---|---|
| JP | 2001-056485 | 2/2001 |
| JP | 2007-328210 | 12/2007 |
| JP | 2008-020753 | 1/2008 |
| JP | 2008-064954 | 3/2008 |
| JP | 2009-047839 | 3/2009 |

* cited by examiner

Primary Examiner — Brian Healy
(74) Attorney, Agent, or Firm — Antonelli, Terry, Stout & Kraus, LLP.

(57) ABSTRACT

Provided is a technology for preventing current leak of a charge holding capacitor which constitutes a pixel of a display device so as to prevent deterioration of display image quality of the display device. The display device includes a first contact hole connecting a first wiring layer and a second wiring layer which is formed over the first wiring layer, a second contact hole connecting the second wiring layer and a third wiring layer which is formed over the second wiring layer, and an electrode layer formed between the plurality of insulating films disposed between the second wiring layer and the third wiring layer, wherein at a position in a substrate surface direction, a distance between a electrode layer and the second contact hole is larger than a distance between the electrode layer and the first contact hole.

12 Claims, 6 Drawing Sheets

ACTIVE MATRIX DISPLAY DEVICE

CROSS-REFERENCE TO RELATED APPLICATION

The present application claims priority from Japanese application JP 2009-104953 filed on Apr. 23, 2009, the content of which is hereby incorporated by reference into this application.

BACKGROUND OF THE INVENTION

1. Field of the Invention

The present invention relates to an active matrix display device, and particularly to a technology which is effective for applying to a substrate having an organic insulating film over which a charge holding capacitor is formed.

2. Description of the Related Art

A liquid crystal panel of an in-plane switching (IPS) type (also referred to as lateral electric field type or fringe field switching (EFS) type) displays images by generating an electric field parallel to a substrate between a pixel electrode and a counter electrode at least in a part, and by driving liquid crystal with the electric field, so as to modulate light passing through the liquid crystal sandwiched between a thin film transistor substrate and a counter substrate.

FIGS. 3A to 3C illustrate an IPS type liquid crystal display device described in JP 2007-328210 A. In this liquid crystal display device, an insulating film 110 and an organic insulating film 111 are formed in the stated order from the bottom so as to cover a pad electrode 108 connected to a polysilicon 103 that is an active layer of a thin film transistor 117. On the organic insulating film 111, there are formed a common electrode 113, an inorganic insulating film 114, and a pixel electrode 116 in the stated order from the bottom so as to form a holding capacitor. Further, there are formed a second contact hole 112 opening in the organic insulating film 111 and a third contact hole 115 that is formed by dry etching of the insulating film 110 and the inorganic insulating film 114 as a batch process.

Here, using SiN as the inorganic insulating film 114, it is possible to form the holding capacitor having a large capacitance.

If a numerical aperture of a pixel is increased, there may be a problem of a short circuit between the common electrode and the pixel electrode. For instance, JP 2008-64954 A discloses a technology for preventing a short circuit between the pixel electrode and the common electrode at a contact part of a common potential line in a FFS type liquid crystal display device.

JP 2008-64954 A describes a structure of a contact hole having a taper angle of 60 degrees or larger, which opens in an interlayer insulating film, for connecting a common potential line with a pad electrode. With this structure, it is possible to prevent diffused reflection when exposing a smoothing layer which is disposed over the contact hole and which is made of a photosensitive resin, so that a recess of the smoothing layer and a short circuit between the common electrode and the pixel electrode caused by the recess may be prevented.

In the conventional technology illustrated in FIGS. 3A to 3C, the insulating film 110 and the inorganic insulating film 114 are made of SiN, and the inorganic insulating film 114 is formed on the organic insulating film 111. Therefore, they may not be formed at high temperature, and the inorganic insulating film 114 is formed at a temperature lower than film forming temperature of the insulating film 110. As a result, the inorganic insulating film 114 is not as dense as the insulating film 110. Therefore, when the inorganic insulating film 114 and the insulating film 110 are processed by dry etching, an etching rate becomes higher in the inorganic insulating film 114 than in the insulating film 110. In this case, as described in JP 2007-328210 A, an edge of the inorganic insulating film 114 may be retracted from an edge of the insulating film 110.

In particular, if a pixel size is reduced so as to increase the resolution of the liquid crystal display device by using the above-mentioned conventional technology, a distance denoted by d in FIG. 3B, which is between the edge of the second contact hole 112 on the common electrode 113 side and the edge of the third contact hole 115 on the common electrode 113 side is decreased, which causes the following problem.

That is, because the etching rate in the inorganic insulating film 114 is faster than the etching rate in the insulating film 110, if the distance between the edge of the second contact hole 112 and the edge of the third contact hole 115 is small, the edge of the inorganic insulating film 114 may be retracted to the organic insulating film 111.

This situation is described with reference to FIG. 3C. At the left side of the third contact hole 115, the inorganic insulating film 114 is retracted to the organic insulating film 111, and hence an exposed part 118 of the organic insulating film is formed.

When the liquid crystal display device having the exposed part of the organic insulating film is operated in an environment of high humidity, moisture in the atmosphere intrudes in liquid crystal 20 illustrated in FIG. 4. In addition, if the moisture intrudes from the exposed part 118 of the organic insulating film into the organic insulating film 111, a resistance of the organic insulating film 111 is decreased so that current leak occurs between the pixel electrode 116 and the common electrode 113. As a result, it becomes difficult to hold a voltage that is applied to the liquid crystal 20, and there occurs a problem that display image quality of the liquid crystal display device is deteriorated. In addition, even in an environment without high humidity, if it is operated for a long term, moisture in the atmosphere may intrude into the liquid crystal 20 so that the same problem as described above may occur.

The technology described in JP 2008-64954 A may prevent a short circuit between the pixel electrode and the common electrode. However, because the distance between the edge of the contact hole opening in the insulating film formed on the organic insulating film and the edge of the contact hole opening in the organic insulating film is small, an exposed part of the organic insulating film is formed. Therefore, the same problem as described above may occur in an operation in an environment of high humidity or in an operation for a long term.

A problem to be solved by the present invention is to prevent current leak of a charge holding capacitor constituting a pixel of a display device so as to prevent deterioration of display image quality in the display device.

SUMMARY OF THE INVENTION

In order to solve the above-mentioned problem, a liquid crystal display device according to the present invention may have the following structure, for example.

A display device includes: a substrate on which a plurality of insulating films and a plurality of wiring layers are formed; a first wiring layer; a second wiring layer which is formed over the first wiring layer and which is connected to the first wiring layer via a first contact hole; a third wiring layer which is formed over the second wiring layer and which is connected to the second wiring layer via a second contact hole; and an electrode layer formed between the plurality of insulating films disposed between the second wiring layer and the third wiring layer, in which at a position in a substrate surface direction, a distance between the electrode layer and the second contact hole is larger than a distance between the electrode layer and the first contact hole.

Note that the above-mentioned structure is merely an example and is not interrupted as a limitation.

According to the present invention, it is possible to prevent formation of an exposed part of the organic insulating film. Therefore, current leak of the charge holding capacitor may be prevented so as to prevent deterioration of display image quality in the display device.

DETAILED DESCRIPTION OF THE INVENTION

Embodiments of the present invention are described with reference to the attached drawings.

Embodiment 1

Embodiment 1 describes the case where the present invention is applied to a peripheral structure of a contact hole connected to an active element in a pixel of an IPS type liquid crystal display device.

Figure 1A:
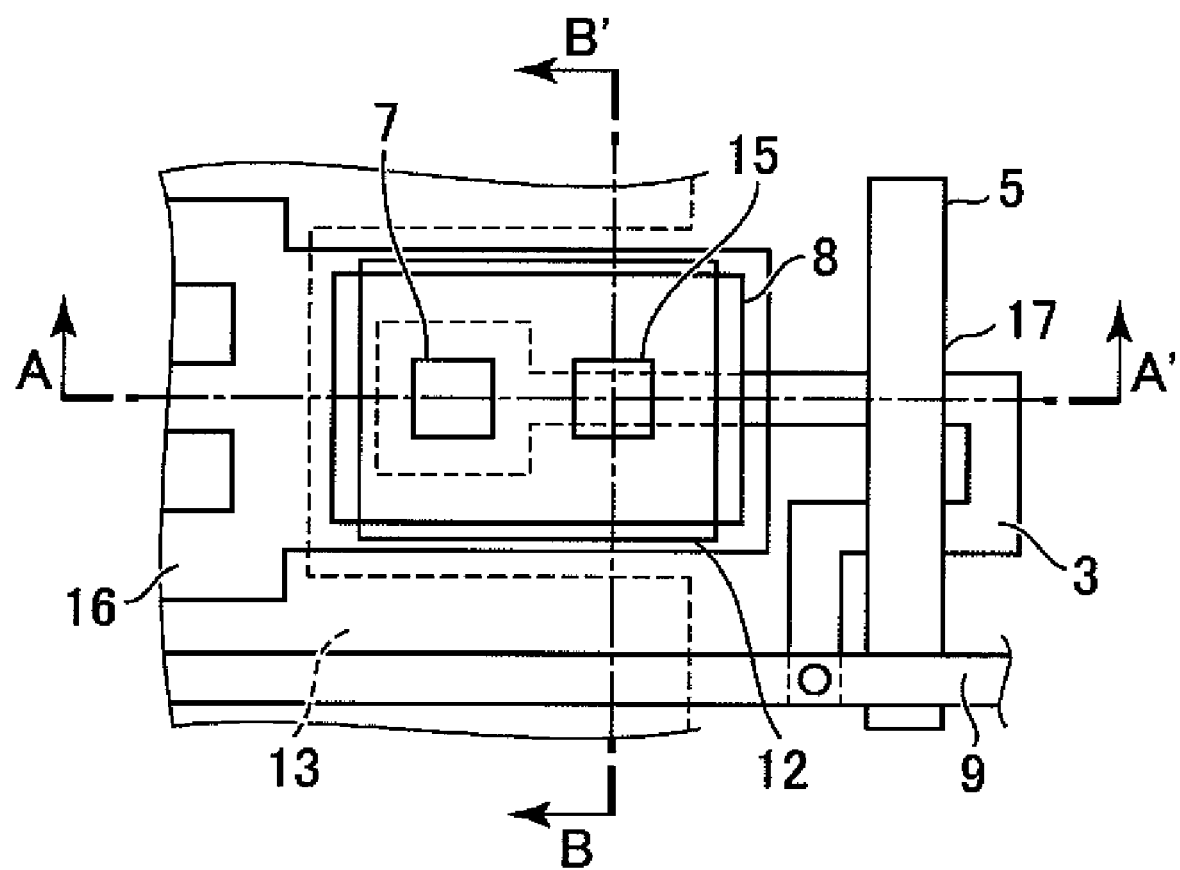
FIG. 1A is a plan view illustrating a pixel part of a thin film transistor substrate according to Embodiment 1 of the present invention.
Figure 1B:
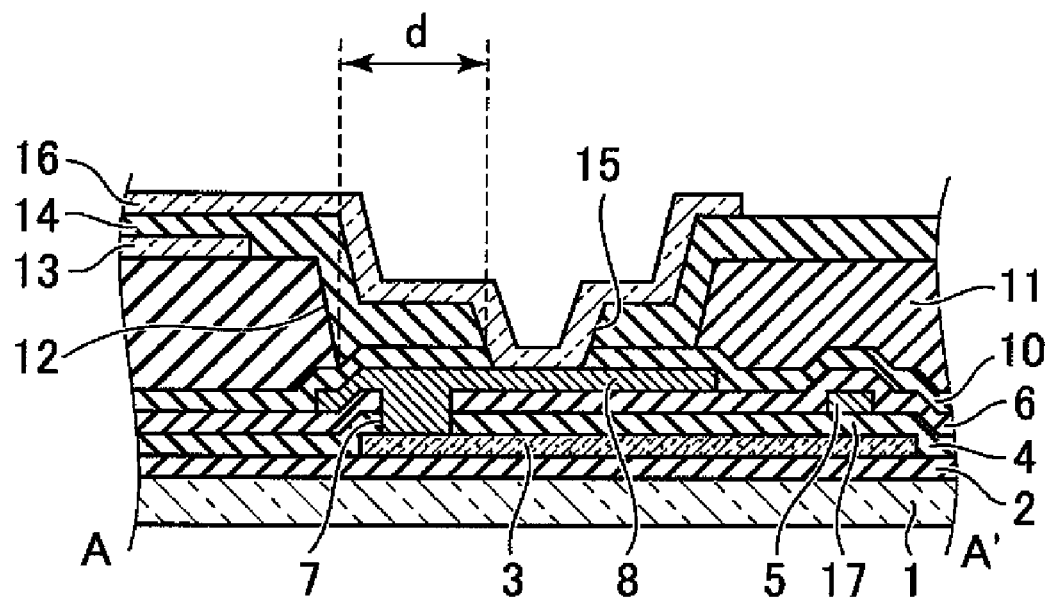
FIG. 1B is a diagram illustrating Embodiment 1 of the present invention, and is a cross sectional view cut along the line A-A' of FIG. 1A.
Figure 1C:
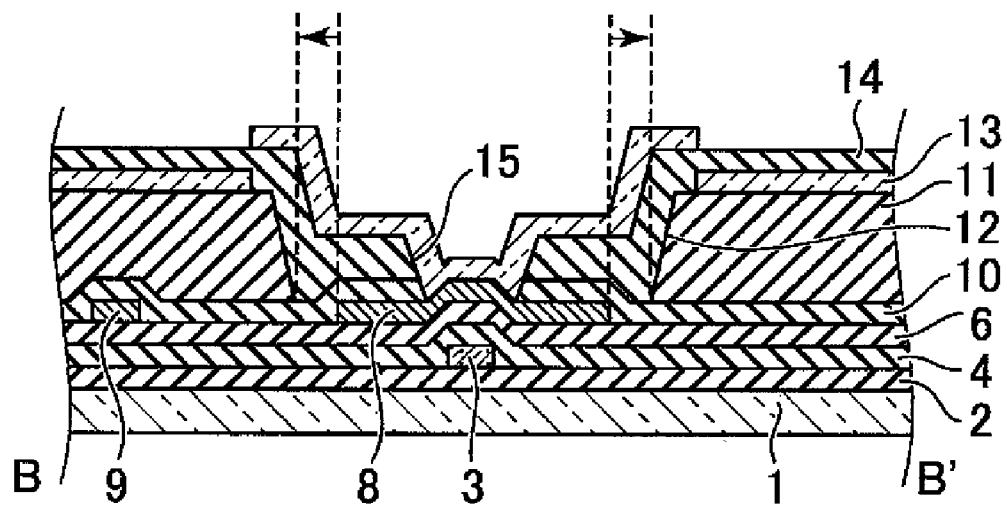
FIG. 1C is a diagram illustrating Embodiment 1 of the present invention, and is a cross sectional view cut along the line B-B' of FIG. 1A.

FIGS. 1A to 1C are diagrams illustrating Embodiment 1 of the present invention. FIG. 1A is a plan view illustrating a pixel part of a thin film transistor substrate. FIG. 1B is a cross sectional view cut along the line A-A' of FIG. 1A. FIG. 1C is a cross sectional view cut along the line B-B' of FIG. 1A. In addition, FIG. 4 is a cross sectional view of the liquid crystal display device.

Figure 4:
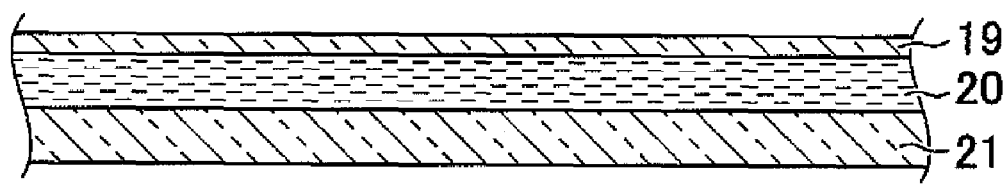
FIG. 4 is a diagram illustrating a cross section of the liquid crystal display device in Embodiment 1 of the present invention.

The liquid crystal display device of this embodiment is an active matrix type liquid crystal display device, as illustrated in FIG. 4, consisting of a thin film transistor substrate 21 including thin film transistors as switching elements on a transparent insulating substrate made of glass or the like, a counter substrate 19 which is opposed to the thin film transistor substrate 21, and liquid crystal 20 sandwiched between the thin film transistor substrate 21 and the counter substrate 19.

On the thin film transistor substrate 21, there are arranged a plurality of pixels in matrix. The thin film transistor substrate 21 includes a plurality of gate lines and a plurality of drain lines which cross the plurality of gate lines. At a vicinity of each intersection thereof, a thin film transistor as a switching element of the pixel is disposed. FIG. 1A illustrates one pixel among the plurality of pixels arranged in matrix.

The thin film transistor substrate of this embodiment includes, as illustrated in FIGS. 1A to 1C, a glass substrate 1, a base insulating film 2 which is formed on the glass substrate 1 and which is constituted of lamination films made of silicon nitride (SiN) and silicon oxide ($SiO_2$), for example, and a polysilicon layer 3 patterned on the base insulating film 2.

A gate insulating film 4 is formed so as to cover the base insulating film 2 and the polysilicon layer 3. In addition, a gate line (scan signal line) 5 is formed and patterned on the gate insulating film 4, and an interlayer insulating film 6 is formed so as to cover the gate insulating film 4 and the gate line 5.

Here, the gate insulating film 4 is constituted of a film of $SiO_2$ formed by chemical vapor deposition (CVD), for example. The gate line 5 is made of molybdenum, for example. The interlayer insulating film 6 is constituted of SiO, SiN, or laminated films of SiO and SiN formed by CVD, for example.

A first contact hole 7 is opened in the gate insulating film 4 and the interlayer insulating film 6. On the interlayer insulating film 6, there is a pad electrode 8 which is patterned and electrically connected to the polysilicon layer 3 via the first contact hole 7.

Here, the first contact hole 7 is opened by dry etching, for example. The pad electrode 8 is constituted of a two-layered structure including a lower layer made of molybdenum and an upper layer made of aluminum, or a three-layered structure including a lower layer made of molybdenum, a middle layer made of aluminum, and an upper layer made of molybdenum, for example.

An insulating film 10 is formed so as to cover the interlayer insulating film 6 and the pad electrode 8. In addition, an organic insulating film 11 is formed on the insulating film 10.

Here, the insulating film 10 is made of SiN, for example. The organic insulating film is formed to have a film thickness of 1.5 to 3.0 μm, for example, by using a coating type photosensitive material.

A second contact hole 12 is opened in the organic insulating film 11.

As for this second contact hole, if the organic insulating film 11 is a coating type photosensitive material, it is formed by exposure and development.

In addition, the second contact hole 12 is formed so as to include the first contact hole 7 in plan view (see FIG. 1A), and so that the edge thereof is provided outside of the pad electrode 8 in the direction parallel to the gate line 5.

A common electrode 13 is formed on the organic insulating film 11 by using indium tin oxide (ITO) as a transparent material, for example.

Here, the common electrode 13 is formed so that the edge thereof is provided outside of the second contact hole 12 in plan view of the thin film transistor substrate 21 (see FIG. 1A). Note that the common electrode 13 does not exist on the gate line 5 side of the second contact hole 12.

An inorganic insulating film 14 made of SiN, for example, is formed so as to cover the organic insulating film 11 and the second contact hole 12, and a third contact hole 15 is opened in the insulating film 10 and the inorganic insulating film 14.

Here, the third contact hole 15 is opened by dry etching, for example.

The third contact hole 15 is formed so as to exist inside the second contact hole 12 in plan view of the thin film transistor substrate 21 (see FIG. 1A), to have no overlapping part with the first contact hole 7, and to exist between the first contact hole 7 and the gate line 5 in the direction perpendicular to the gate line 5.

On the inorganic insulating film 14, there is a pixel electrode 16 which is patterned and electrically connected to the pad electrode 8 via the third contact hole 15.

Here, the pixel electrode 16 is formed so as to have a comb-like shape at the pixel opening part as a region through which light passes in the pixel. In addition, the common electrode 13 is formed like a sheet. The common electrode 13 works as the counter electrode so as to drive the liquid crystal 20 by an electric field generated between the pixel electrode 16 and the common electrode 13 for performing a display.

The pixel electrode 16 and the common electrode 13 are formed as a transparent electrode made of indium tin oxide (ITO), for example. Thus, light from a backlight (not shown) may be used for performing transmission type display.

According to the above-mentioned structure, a distance d between the edge of the second contact hole 12 on the common electrode 13 side and the edge of the third contact hole 15 on the common electrode 13 side may be increased (see FIG. 1B), and hence formation of an exposed part of the organic insulating film may be prevented. Therefore, current leak of the holding capacitor may be prevented, and hence deterioration of display image quality of the liquid crystal display device may be prevented. With the above-mentioned structure, the third contact hole 15 becomes close to the edge of the second contact hole opening in the organic insulating film 11 on the right side in FIG. 1B, but there is no common electrode 13 on the right side. Therefore, there is no problem even if the organic insulating film is exposed.

In addition, a center of the third contact hole 15 is positioned in a middle of the second contact hole 12 in the direction parallel to the gate line in plan view (see FIG. 1A), and the edge of the second contact hole 12 exists outside the pad electrode 8 (see FIG. 1C), and hence there is a sufficient distance between the edge of the second contact hole 12 and the edge of the third contact hole 15. Therefore, formation of an exposed part of the organic insulating film may be prevented also in the direction parallel to the gate line. Therefore, current leak of the holding capacitor may be prevented, and hence deterioration of display image quality of the liquid crystal display device may be prevented.

Here, a variation of leak current of the holding capacitor in the case where the thin film transistor substrate of the conventional technology and the thin film transistor substrate of this embodiment are exposed to an environment of high temperature and high humidity is described.

A process of exposing the thin film transistor substrates to constant temperature and constant humidity environment at a temperature of 60 degrees centigrade and humidity of 90% RH was performed, and a relationship between the processing time and the leak current of the holding capacitor, that is, the leak current between the common electrode and the pixel electrode was checked.

Figure 5:
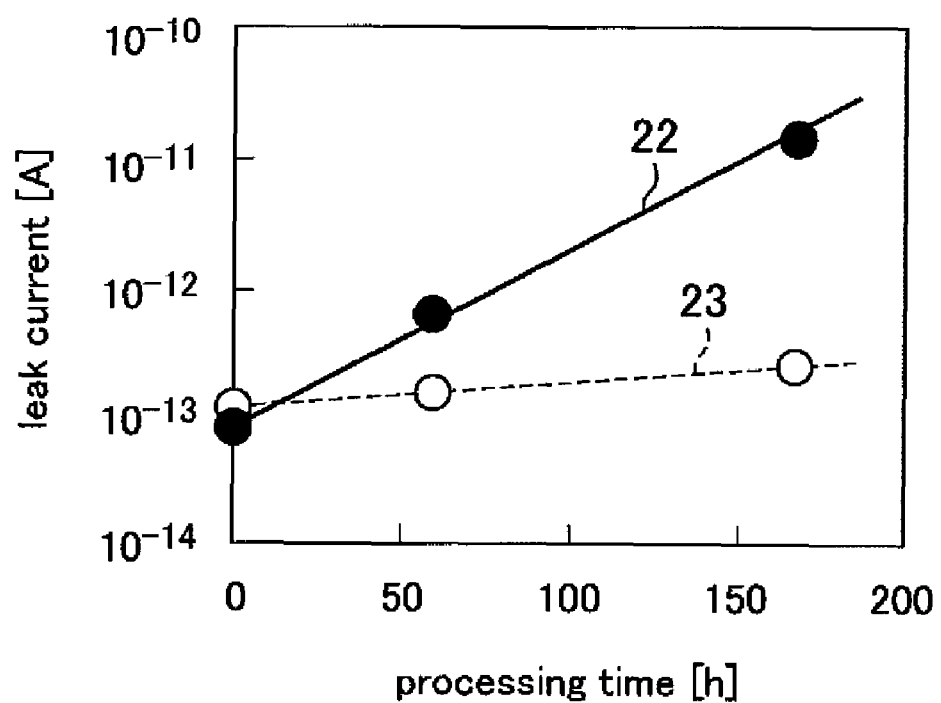
FIG. 5 is a graph illustrating a relationship between processing time of the thin film transistor substrate in constant temperature and constant humidity environment and leak current of a holding capacitor in Embodiment 1 of the present invention.

The horizontal axis of FIG. 5 represents the processing time, and the vertical axis thereof represents the leak current of the holding capacitor. In addition, plots 23 indicate the relationship in the case where the thin film transistor substrate of this embodiment is used, and plots 22 indicate the relationship in the case where the thin film transistor substrate of the conventional technology is used.

It is understood that the leak current increases along with an increase of the processing time in the case of the thin film transistor substrate of the conventional technology. When the process lasts 170 hours, the leak current increases by approximately 180 times.

In contrast, in the case of the thin film transistor of this embodiment, there is little leak current increase even if the processing time increases. Thus, it is understood that current leak is prevented.

Embodiment 2

Embodiment 2 describes an example in the case where the present invention is applied to a peripheral structure of a contact hole connected to the common potential line 18 in a pixel of a lateral electric field type liquid crystal display device.

Figure 2A:
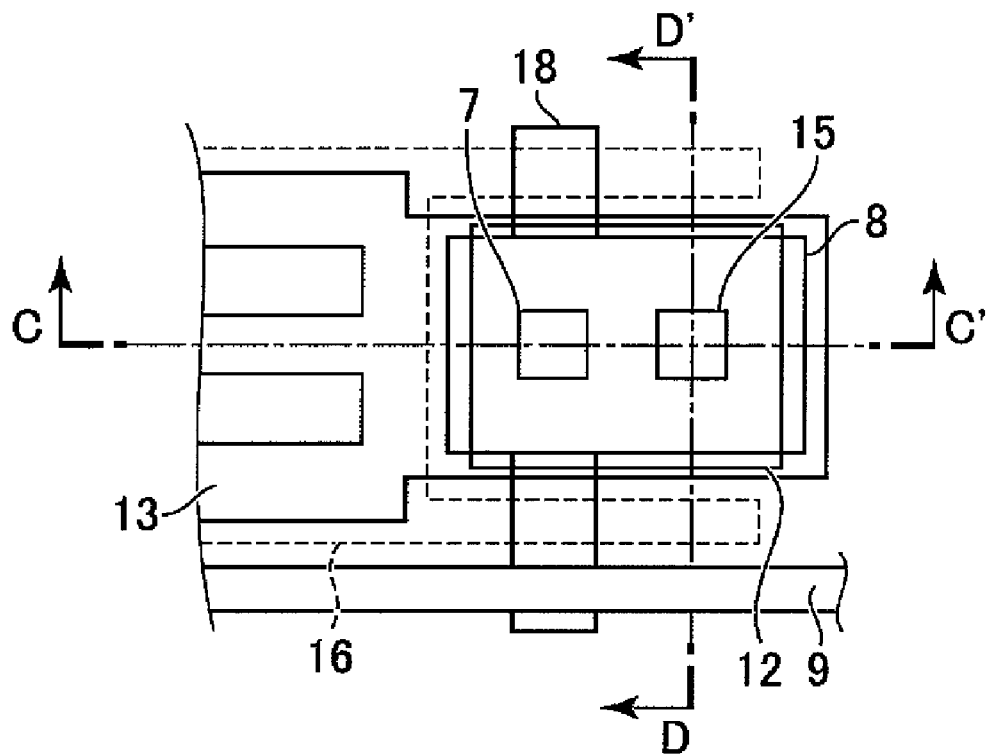
FIG. 2A is a plan view illustrating a pixel part of a thin film transistor substrate according to Embodiment 2 of the present invention.
Figure 2B:
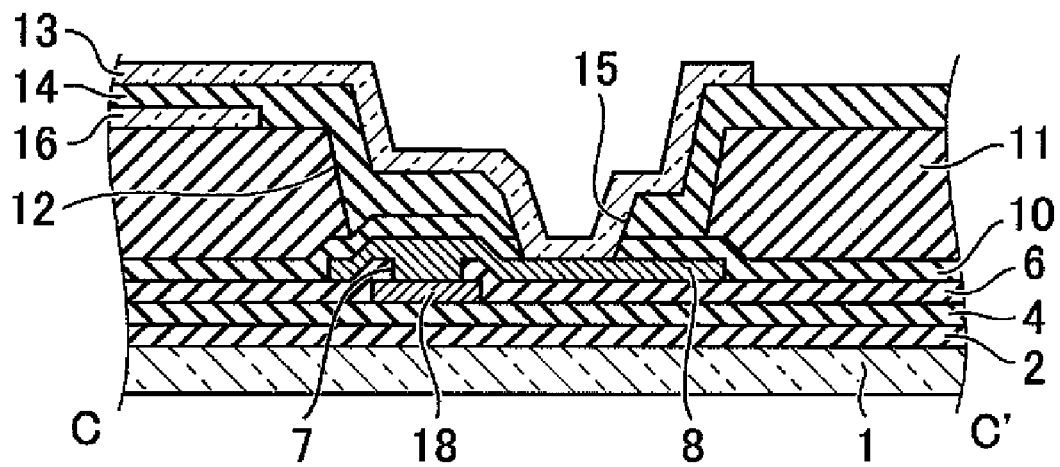
FIG. 2B is a diagram illustrating Embodiment 2 of the present invention, and is a cross sectional view cut along the line C-C' of FIG. 2A.
Figure 2C:
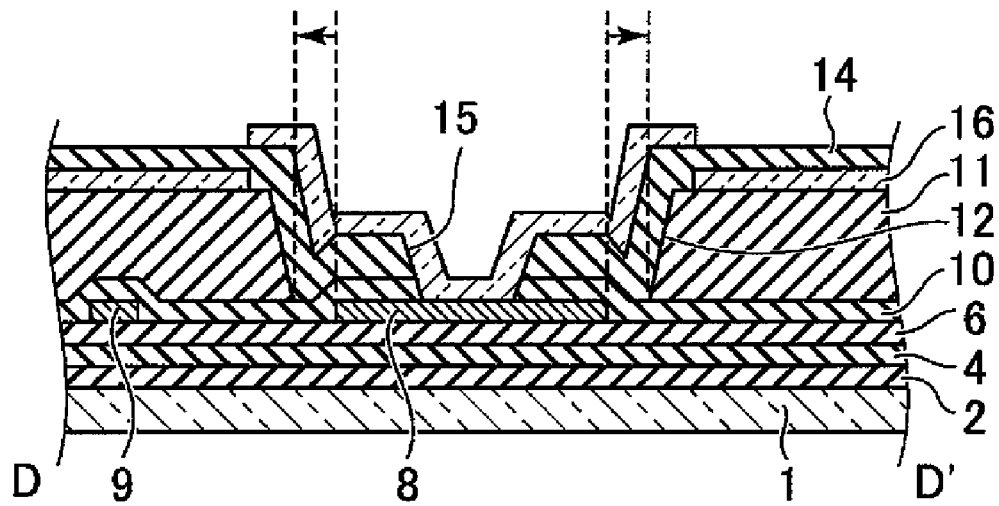
FIG. 2C is a diagram illustrating Embodiment 2 of the present invention, and is a cross sectional view cut along the line D-D' of FIG. 2A.
Figure 3A:
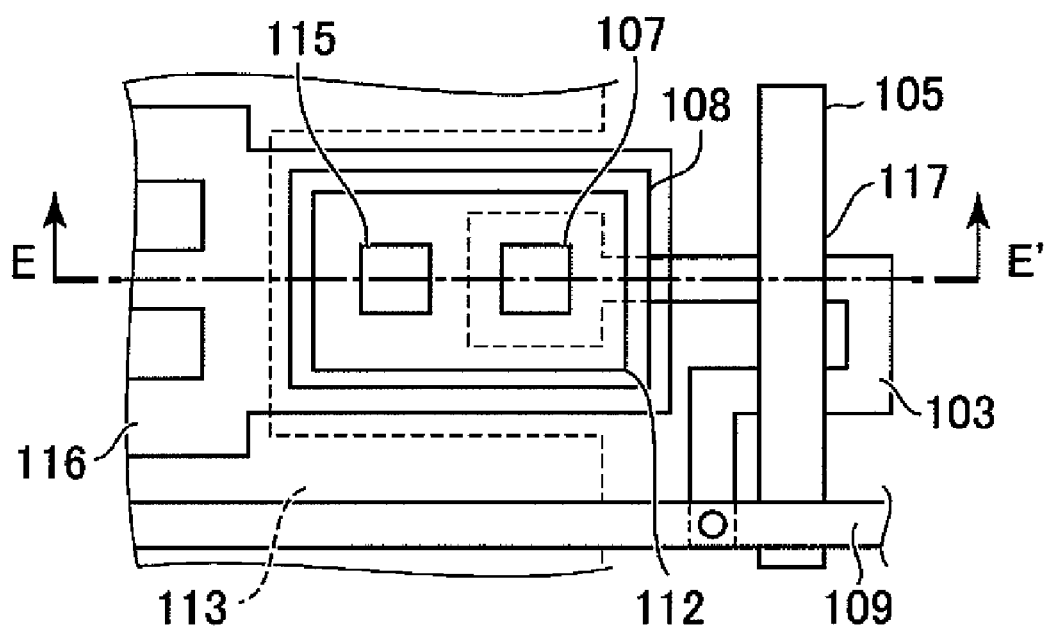
FIG. 3A is a plan view illustrating a pixel part of a thin film transistor substrate according to a conventional liquid crystal display device.
Figure 3B:
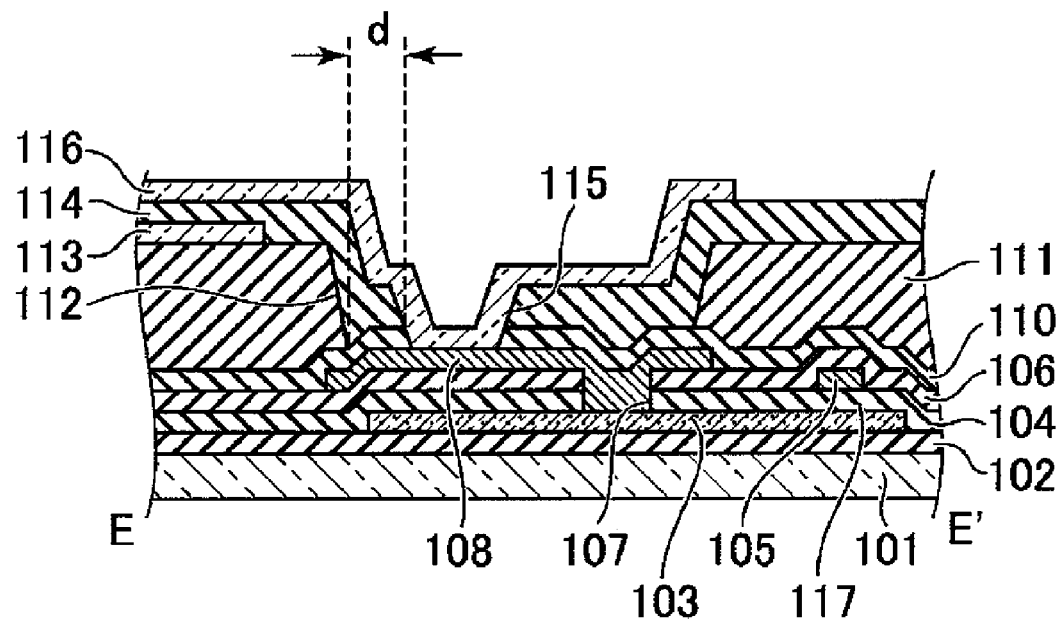
FIG. 3B is a diagram illustrating the conventional liquid crystal display device, and is a cross sectional view cut along the line E-E' of FIG. 3A.
Figure 3C:
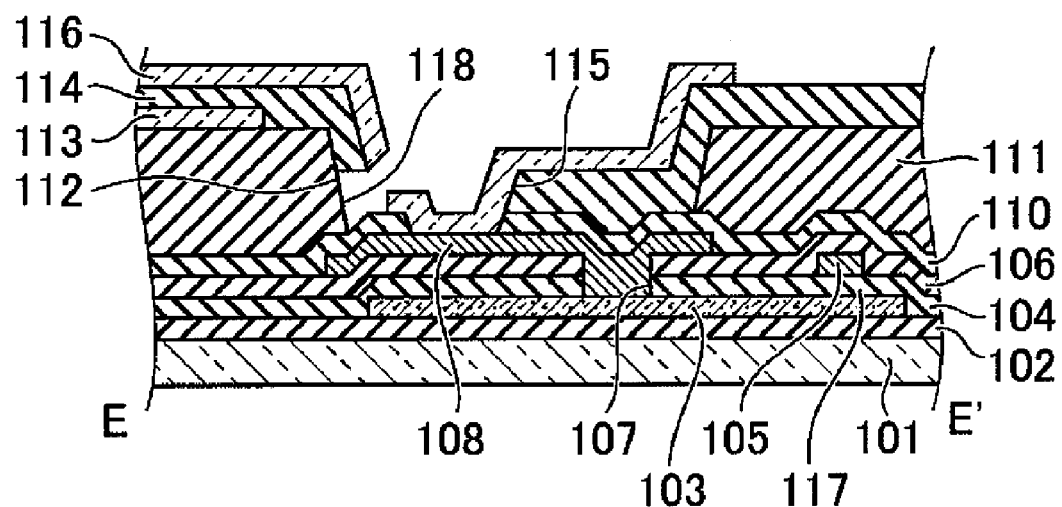
FIG. 3C is a diagram illustrating the conventional liquid crystal display device, and is an example of a cross section cut along the line E-E' of FIG. 3A.

FIGS. 2A to 2C are diagrams illustrating Embodiment 2 of the present invention. FIG. 2A is a plan view illustrating a pixel part of a thin film transistor substrate. FIG. 2B is a cross sectional view cut along the line C-C' of FIG. 2A. FIG. 2C is a cross sectional view cut along the line D-D' of FIG. 2A.

In the above-mentioned Embodiment 1, the common electrode 13 is formed between the organic insulating film 11 and the inorganic insulating film 14, and the pixel electrode 16 is formed on the inorganic insulating film 14. In this embodiment, however, the common electrode 13 and the pixel electrode 16 are exchanged. In other words, as illustrated in FIG. 2B, the pixel electrode 16, the inorganic insulating film 14, and the common electrode 13 are formed in the stated order on the organic insulating film 11.

In addition, the common potential line 18 and the pad electrode 8 are connected to each other via the first contact hole 7 that is opened in the interlayer insulating film 6 on the common potential line 18. In addition, the second contact hole 12 is formed so as to be opened in the organic insulating film 11 formed over the pad electrode 8.

The first contact hole 7, the second contact hole 12, and the third contact hole 15 are formed so as to have the features described in Embodiment 1.

Other points except for the above-mentioned description are the same as Embodiment 1.

Embodiment 3

Embodiment 3 describes an example in the case where the present invention is applied not to a liquid crystal display device of a horizontal electric field type but to a liquid crystal display device of a vertical electric field type.

In this case, the common electrode 13 to which the common potential is applied is formed on the liquid crystal side of the counter substrate in the structure of Embodiment 1.

The electrode formed between the organic insulating film 11 and the inorganic insulating film 14 (electrode corresponding to the common electrode 13 illustrated in FIGS. 1A to 1C) forms the holding capacitor together with the pixel electrode 16 and the inorganic insulating film 14.

Other points except for the above-mentioned description are the same as Embodiment 1.

In addition, the present invention is not limited to the application to a liquid crystal display device but may also be applied to any active matrix display device having an active element and a holding capacitor. Further, the present invention may suppress leak current of the holding capacitor even if the pixel size of the display device is decreased. Therefore, it may be applied to a high definition liquid crystal display.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display device, comprising:
 a substrate on which a plurality of insulating films and a plurality of wiring layers are formed;
 a first wiring layer;
 a second wiring layer which is formed over the first wiring layer and which is connected to the first wiring layer via a first contact hole;
 a third wiring layer which is formed over the second wiring layer and which is connected to the second wiring layer via a second contact hole; and
 an electrode layer formed between the plurality of insulating films disposed between the second wiring layer and the third wiring layer,
 wherein at a position in a substrate surface direction, a distance between the electrode layer and the second contact hole is larger than a distance between the electrode layer and the first contact hole.

2. The display device according to claim 1, wherein one of the plurality of insulating films disposed between the second wiring layer and the third wiring layer comprises an organic insulating film.

3. The display device according to claim 2, wherein one of the plurality of insulating films disposed between the second wiring layer and the electrode layer comprises an organic insulating film.

4. The display device according to claim 1, wherein the first contact hole and the second contact hole are not overlapped with each other in the substrate surface direction.

5. The display device according to claim 1, wherein:
 the plurality of insulating films disposed between the second wiring layer and the third wiring layer has an opening part including a third contact hole; and
 in the substrate surface direction, the second contact hole is included inside the third contact hole.

6. The display device according to claim 5, wherein:
 the plurality of insulating films disposed between the second wiring layer and the third wiring layer include:
  a first inorganic insulator layer formed on the second wiring layer;
  an organic insulating film layer formed over the first wiring layer; and
  a second inorganic insulating film layer which is formed over the organic insulating film layer and on which the third wiring layer is formed; and
 in the third contact hole, the second inorganic insulating film is directly formed on the first inorganic insulating film.

7. The display device according to claim 6, wherein the organic insulating film and the electrode layer do not exist inside the third contact hole in the substrate surface direction.

8. The display device according to claim 5, wherein in the substrate surface direction, the first contact hole is included inside the third contact hole.

9. The display device according to claim 1, wherein:
 the electrode layer comprises a common electrode layer;
 the third wiring layer comprises a pixel electrode layer; and
 the common electrode layer and the pixel electrode layer are opposed to each other in a pixel opening region.

10. The display device according to claim 1, wherein:
 the first wiring layer includes:
  a pad electrode part which is connected to the first contact hole; and
  a wiring part which connects the pad electrode part with another wiring; and
 the wiring part is led out from the pad electrode part at a position that is closer to the second contact hole than the first contact hole in the substrate surface direction.

11. The display device according to claim 10, wherein the wiring part of the first wiring layer is led out to a side different from a side on which the electrode layer is formed with respect to the pad electrode part.

12. The display device according to claim 1, further comprising:
 another substrate which is opposed to the substrate; and
 liquid crystal filled between the substrate and the another substrate.

* * * * *